(12) United States Patent
Klima

(10) Patent No.: US 10,089,288 B2
(45) Date of Patent: Oct. 2, 2018

(54) ANNOTATIONS MANAGEMENT FOR ELECTRONIC DOCUMENTS HANDLING

(71) Applicant: CA, Inc., Islandia, NY (US)

(72) Inventor: Kristian Klima, Michalovce (SK)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/959,548

(22) Filed: Dec. 4, 2015

(65) Prior Publication Data

US 2017/0161246 A1 Jun. 8, 2017

(51) Int. Cl.
*G06F 17/00* (2006.01)
*G06F 17/24* (2006.01)
*G06F 3/0484* (2013.01)
*G06F 17/28* (2006.01)
*G06F 17/27* (2006.01)

(52) U.S. Cl.
CPC .......... *G06F 17/241* (2013.01); *G06F 3/0484* (2013.01); *G06F 17/275* (2013.01); *G06F 17/289* (2013.01)

(58) Field of Classification Search
None
See application file for complete search history.

(56) References Cited

U.S. PATENT DOCUMENTS

| | | | | |
|---|---|---|---|---|
| 5,987,402 | A * | 11/1999 | Murata | G06F 17/289 704/2 |
| 9,275,368 | B1 * | 3/2016 | Harpalani | G06Q 10/10 |
| 9,465,803 | B2 * | 10/2016 | Sik | G06F 17/241 |
| 9,501,506 | B1 * | 11/2016 | Fontoura | G06F 17/30631 |
| 2005/0160355 | A1 * | 7/2005 | Cragun | G06F 17/241 715/230 |
| 2005/0160356 | A1 * | 7/2005 | Albornoz | G06F 17/2288 715/229 |
| 2006/0150079 | A1 * | 7/2006 | Albornoz | G06F 17/241 715/230 |
| 2008/0127163 | A1 * | 5/2008 | Fong | G06F 8/51 717/170 |
| 2008/0281578 | A1 * | 11/2008 | Kumaran | G06F 17/28 704/2 |
| 2010/0286977 | A1 * | 11/2010 | Chin | G06F 17/289 704/4 |
| 2012/0060082 | A1 * | 3/2012 | Edala | G06F 17/241 715/231 |
| 2013/0047066 | A1 * | 2/2013 | Lee | G06F 17/30011 715/229 |
| 2013/0117008 | A1 * | 5/2013 | Condie | G06F 17/289 704/2 |
| 2014/0006919 | A1 * | 1/2014 | He | G06F 17/241 715/230 |
| 2014/0115436 | A1 * | 4/2014 | Beaver | G06F 17/2288 715/229 |

(Continued)

*Primary Examiner* — Howard Cortes
(74) *Attorney, Agent, or Firm* — Alliance IP, LLC

(57) ABSTRACT

Embodiments are directed to providing a graphical interface for annotating an electronic document, receiving, from a user, an annotation to the electronic document via the interface, associating the annotation to the electronic document with a annotation identifier, the annotation identifier comprising a credential associated with the user, a unique identifier for the electronic document, and metadata associated with the electronic document, and storing the annotation with the annotation identifier.

19 Claims, 7 Drawing Sheets

(56) References Cited

U.S. PATENT DOCUMENTS

| | | | |
|---|---|---|---|
| 2014/0310305 A1* | 10/2014 | Christiansen | G06F 17/241 707/769 |
| 2015/0100872 A1* | 4/2015 | Beezer | G06F 17/241 715/230 |
| 2017/0012993 A1* | 1/2017 | Lieu | G06F 17/241 |
| 2017/0060829 A1* | 3/2017 | Bhatt | G06F 17/2235 |
| 2017/0161246 A1* | 6/2017 | Klima | G06F 17/241 |

\* cited by examiner

ANNOTATIONS MANAGEMENT FOR ELECTRONIC DOCUMENTS HANDLING

BACKGROUND

This disclosure pertains to managing comments between documents, and more particularly, to managing comments between documents using a cluster identifier.

Collaborations often rely on exchanges of documents between collaborators, who may be using different systems, languages, and document versions. Version tracking and comments tracking relies on the retention of a master document that may not reflect all comments added to a document or changes to a version.

SUMMARY

Aspects of the embodiments are directed to providing a graphical interface for annotating an electronic document; receiving, from a user, an annotation to the electronic document via the interface; associating the annotation to the electronic document with a annotation identifier, the annotation identifier comprising a credential associated with the user, a unique identifier for the electronic document, and metadata associated with the electronic document; and storing the annotation with the annotation identifier.

Aspects of the embodiments are directed to receiving an annotation to an first version of the electronic document, the annotation comprising with a annotation identifier, the annotation identifier comprising credentials associated with an author of the annotation, a unique identifier for the electronic document, and metadata associated with the electronic document; identifying a local version of the electronic document based, at least in part, on the unique identifier for the first version of the electronic document in the annotation identifier; and associating the annotation with local version of the electronic document.

In some embodiments, associating the electronic document with metadata associated with the electronic document may include identifying a location in the electronic document associated with the annotation received from the user.

In some embodiments, associating the annotation to the electronic document with metadata associated with the electronic document may include associating the annotation with an identifier of the location of the electronic document associated with the annotation.

In some embodiments, the metadata associated with the electronic document comprises one of a version number, a language identifier, a page number of the electronic document, a section number of the electronic document, a chapter number of the electronic document, a paragraph number of the electronic document, a line number of the electronic document, a string of text from the electronic document, a figure number from the electronic document, or a table number from the electronic document.

DETAILED DESCRIPTION

Figure 1:
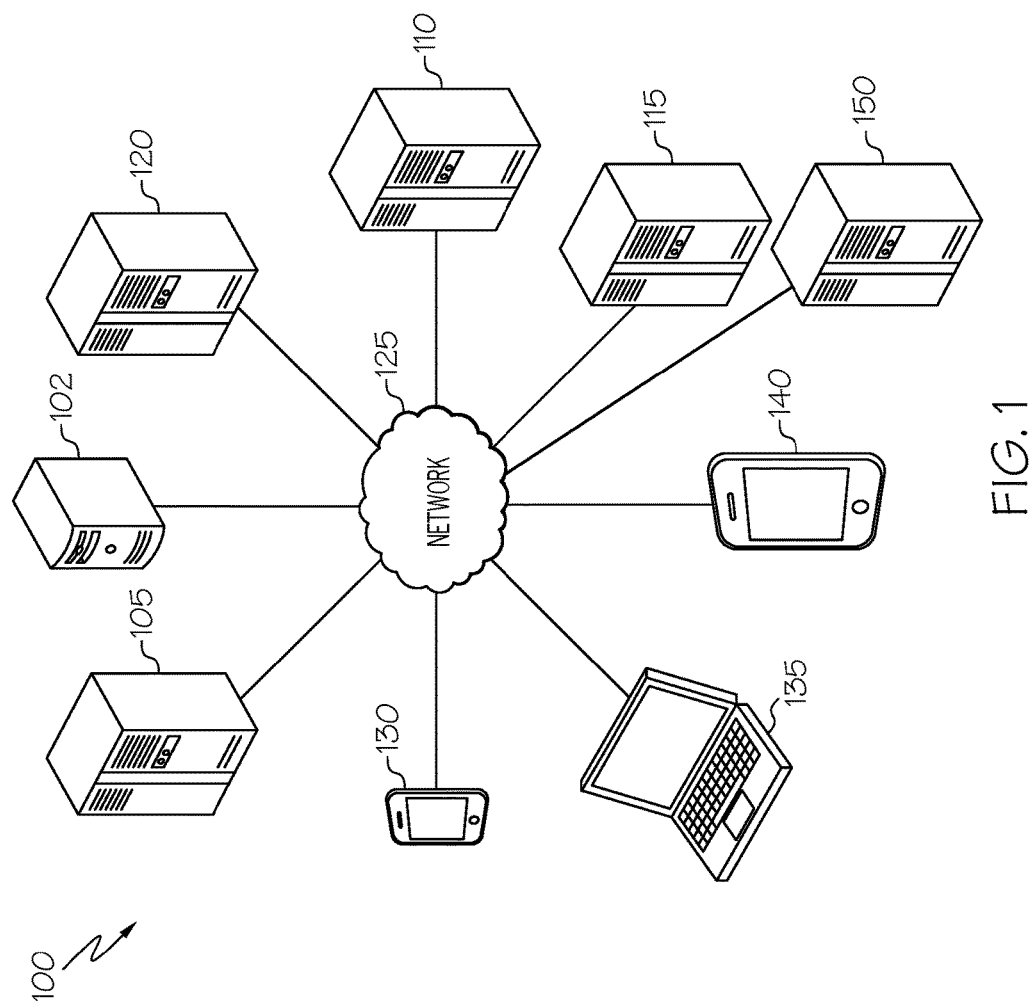
FIG. 1 is a simplified schematic block diagram of a system for handling document comments in accordance with at least one embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

This disclosure addresses issues involving the migration of comments and other annotations (generally, "annotations") of a document between multiple users and across multiple devices. This disclosure also addresses issues involving migrating annotations between multiple versions of the same document.

This disclosure describes systems, devices, computer program products, and methods for providing annotations management for electronic documents handling. An electronic document can include electronic books and webpages, as well as other electronic documents, such as office productivity documents, portable documents, XPS files, etc. An annotation engine can facilitate the linkage between annotations made in a first document to be migrated to other versions of the same document (versions meaning revisions, language versions, etc.). The annotation can be stored separately from the first document in a library, such as a cloud-based library, and other documents can be synchronized with stored annotations across a network by accessing annotations from the library. In some embodiments, the annotation file can be sent to another "target" user (of group of users), and the annotation engine can extract document information from the annotation identifier to synchronize a document at the target user with the annotation.

This disclosure also addresses managing several annotations for a single document. For example, with comments nested on their own layer or data structure and comprehensively identified, a annotations library can be created and annotations can be sorted by various attributes. The storing and sorting of annotations allows sending a specific annotation (in a given chapter, by an author, etc.) to other users, systems, storage media, etc. For example, testers in pre-deployment phase can annotate a document at several locations, where each annotation can include its own identifier (including an in-document location identifier), then push the annotations to selected users across a network.

Advantages of the disclosure are readily apparent. Examples of advantages may include the ability of a user sharing his/her comments/annotations with specified user(s); migration of annotations in between versions of a document; migrating annotations from a first language version to a second version; integrating translation services with electronic document annotation platforms, facilitating the sorting and filtering of comments based on specific attributes; the ability to distribute/push annotations in bulk to several users to facilitate mass migration of annotations to a plurality of documents, among other example advantages as should be apparent from the following disclosure and claims.

FIG. 1 is a simplified schematic block diagram of a system level annotation handling environment 100 for handling document comments in accordance with at least one embodiment of the disclosure. System level annotation handling environment 100 may include a client device, such as client device 130, 135, or 140. Client device may be a computing device, such as a desktop, laptop, tablet, smartphone, etc. The client device can be any device that can allow a user to view and annotate electronic documents, and in some cases, allow the user to upload annotation files to a network location.

System level annotation handling environment 100 may also include one or more servers and storage media. For example, a annotation handling application server an annotation handling application server 102 for hosting an annotation handling application for managing the generation and storage of annotation files and the augmentation of documents with annotations. The annotation handling environment 100 can also include a database system 110 for storing annotation files and corresponding metadata (including cluster identifiers), a database system 115 for storing electronic documents and corresponding metadata (e.g., electronic documents with annotations, pointers to (titles of) electronic documents that may be stored remotely or on client devices, etc.), and a database system 120 for relating information in an annotation identifier (also referred to as a cluster identifier) to specific users, documents, document language, document annotation locations, annotation language etc. In some embodiments, the system level annotation handling environment 100 can include an authentication server to authenticate user access to annotations (e.g., for synchronizing annotations across multiple devices for the same or different users, etc.). In some embodiments, the system level annotation handling environment 100 can include a translation service 125. The translation service 125 can be a networked or remote translation service program provided by third parties or may be locally hosted using proprietary or publicly available translation services applications.

The various system components can be interconnected through a network 125, such as the Internet, cellular network, and/or WAN/LAN.

In general, "servers," "clients," "computing devices," "network elements," "hosts," "system-type system entities," "user devices," and "systems", etc. in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the system level annotation handling environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a testing system 105, the abstraction layer, host servers or other sub-system or component of system level annotation handling environment 100 can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within system level annotation handling environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
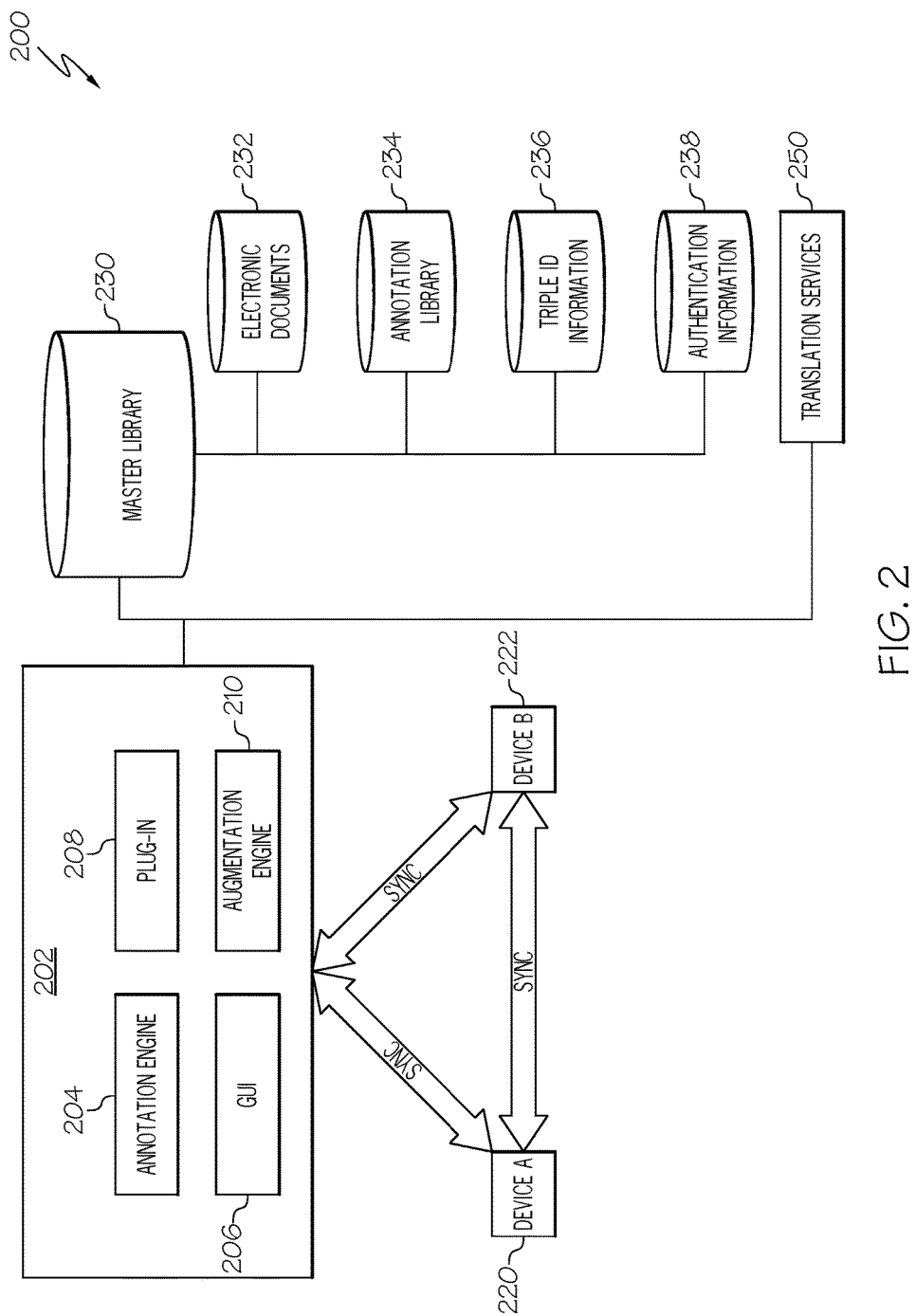
FIG. 2 is a schematic block diagram of an annotation handling environment 300 in accordance with embodiments of the present disclosure.

FIG. 2 is a simplified schematic block diagram of an annotation handling environment 200 in accordance with embodiments of the present disclosure. The annotation handling environment 200 can include an application handling application 202. Application handling application 202 can be run on a computing device, such as a desktop computer, laptop, tablet, smartphone, etc. as a stand-alone application or as a remote application running on an application server. The annotation handling application 202 can also be a plug-in to a web browser, PDF editor, document editor, or other electronic document program. The annotation handling application 202 can be an overlay type plug-in 208 over another program.

A user viewing an electronic document can enter an annotation into the document using the annotation handling application 202. The annotation may take the form of a comment (e.g., comment bubble or margin comment etc.), a "tracked change," an in-line edit to text or a figure, a highlight, a hand-written note that is converted to computerized text (e.g., such as from a stylus on a smartphone screen), added text, sentences, paragraphs, pages, etc., or other type of annotation.

The annotation handling application 202 can include an annotation engine 204. In some embodiments, the annotation engine 204 can be implemented hardware, software, firmware, or a combination. The annotation engine 204 can be configured to create an annotation file from an annotation made on a client device (e.g., device A 220 or device B 222). The annotation engine 204 can include as metadata an identifier that includes information about the document and, in some embodiments, information about the user who created the document. The identifier can be included with the annotation file metadata for augmenting a similar document on a different machine or device or being viewed by a different user.

The annotation file can be stored in an annotation library 234. Annotation files can be retrieved by an augmentation engine 210 that can augment documents with annotations. The augmentation engine 210 can use information in the annotation identifier to identify a target document, location within the document for the annotation, and language information, as well as other information, such as the author of the annotation. The augmentation engine 210 can augment the document with the annotation. The augmentation engine 210 can store documents with annotations in a database for electronic documents 232.

The augmentation engine 210 can also be called to augment a document with annotations by the application handling application 202 when a user opens a document and requests a synchronization of annotations for the document.

As an example, a user operating client device 1 can open a first document in a document application. The annotation handling application 202 can be run simultaneously as an overlay to the document application or as a plug-in. In some embodiments, the annotation handling application 202 can be run and provide an interface to a document application.

The user can add an annotation to the first document using client device 1. Creating the annotation can cause the annotation engine 204 to create an annotation file with a cluster identifier. Saving the first document can cause the annotation engine to store an annotation file in an annotation library 234, the annotation file including the annotation(s) made, the location in the document of each annotation (e.g., paragraph number, line/page number, special phrase/keyword, etc.), the language of the document annotated, and the version of the document annotated. In some embodiments, the language of the annotation can also be identified in the cluster identifier, which can be used by the translation services 250 to translate the annotation into a desired language for a target document.

The user may then open a document that resides on a different device, client 2 222. The user can request that this "target" document be synchronized with annotations made when the user was operating client 1 220 and annotating the first document. Annotations stored in annotation library 234 can be synchronized with the document residing on device B 222. In some embodiments, the augmentation engine 210 can automatically synchronize the target document with the annotation when the user requests access to the target document—in that case, the document can be a local document or can be located in a network location, such as the cloud or other remote storage location.

In some implementations, a user may have an account that can cause an electronic document residing on devices owned by the same user and linked to the account to synchronize with the stored annotation in the annotation library 234. In a similar manner, an annotation can be pushed in bulk to all subscribers or authorized users. In some embodiments, the annotation can be communicated directly across a Bluetooth or Wifi or other wireless connection or a wired connection between disparate devices (e.g., a tablet to a desktop), so the user can continue working on the document seamlessly. A user can log in to an account using authentication information. A security server 238 can use stored authentication information and other security protocols to verify the user prior to synchronizing the annotations with corresponding target documents. This way, all users with appropriate levels of authentication can synchronize documents with annotations stored in annotation library 234.

A cluster identifier (ID) information database 236 can be used to relate information in the annotation cluster identifier to the corresponding information. For example, for a cluster ID that includes a document identifier, the cluster ID information 236 can be used to identify the document based on the document identifier. The cluster ID information 236 can include all information corresponding to cluster ID fields.

In some embodiments, a master library 230 can store all information required to create annotations files and augment documents with annotations. In some embodiments, each data store (232-238) can be a remote storage unit accessed across a network.

Figure 3:
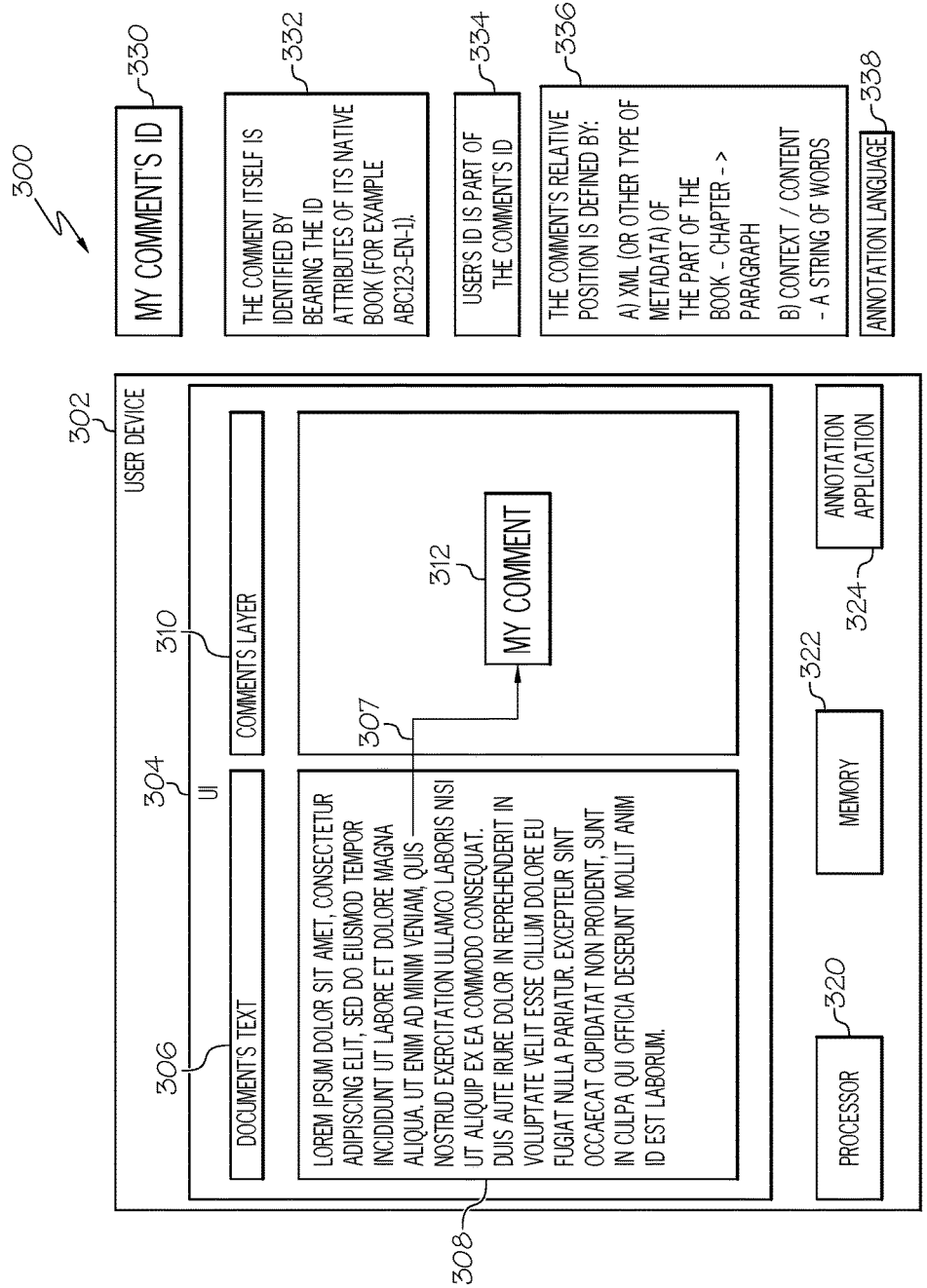
FIG. 3 is a schematic block diagram of an annotation interface in accordance with embodiments of the present disclosure.

FIG. 3 is a schematic block diagram of an annotation interface in accordance with embodiments of the present disclosure. A user device 302 can include a processor 320, a memory 322, and an annotation handling application 324. The annotation handling application 324 can interface with a GUI 304 provided by a document application or the annotation handling application can provide the GUI 304 in which a document can be viewed, edited, annotated, stored, etc.

The document text layer 306 can include text and figures for a document. A comments layer 310 can provide annotations interface to the document. The document would be stored with both the original text and the corresponding annotation. The annotation itself can be stored as an annotation file.

Additionally, an annotation identifier 330 (e.g., cluster ID) is stored with the annotation (e.g., as metadata). The annotation identifier can include document identification information 332 about the document. For example, the document identification information can include a unique identifier of the document, a language of the document, and a version number of the document.

In the example provided in FIG. 3, the document text 308 includes non-English words. The language of the document can be identified and added to the annotation identifier (e.g., as part of the document identification information). The language can be used as metadata of the annotation by language services to translate the annotation from the language of the document to another language. In this embodiment, there is an assumption that the language of the annotation matches the language of the document, which is often the case.

The version of the document can be included in the annotation identifier 330 so that annotation synchronization can be controlled across different versions of the same document. For example, synchronization can be controlled so that annotations to version 1 only synchronize with other documents of version 1, and not subsequent versions. In some embodiments, annotations can carry through to subsequent versions until the annotation has been addressed. For example, an annotation that comments on a paragraph in version 1 may not be addressed till version 3, which means that the comment needs to synchronize with all version 2 documents.

The annotation identifier can also include a location 336 of the annotation within the progenitor document. The annotation in this example is a comment 312 about a particular portion of the text 308. The portion of the text can be identified by a "location" 307, which can be a page number, paragraph number, section number, line number, figure number, table number, combination of any of the preceding (e.g., page/line number) or other unique identifier of a location of a progenitor document. The location 307 can be extracted from metadata of the progenitor document. This location 307 can correspond to location information within the annotation identifier 330.

In some embodiments, a string of words (alone or with another identifier, such as a page number of paragraph number) can be used as a location identifier 336.

When shared, an annotation should end up in the same part of the target document, so the annotation is anchored to one place. If the content changes (in the new version) and the physical position of the annotated content moves, the real position of the annotation can still be identified when the annotation is migrated.

If such a section no longer exists in the target document, an error message can be generated—but the annotation can still be integrated in the particular section, chapter, or other smallest granularity of location identifiable for the particular annotation.

The annotation identifier 330 can also include a user ID 334. The user ID can be used to authenticate a user for subsequent synchronization of the annotation with other instances of the document (e.g., a same document stored on a different computer). The user ID can also be used to track annotation authors when multiple annotation exist for the same document.

The annotation identifier 330 can also include a language of the annotation 338. The language of the annotation can be extrapolated from information about the user, the user device settings, the document application settings, the document language, etc. The language of the annotation can be preset by the user. For example, a user sitting in Sweden annotating an English language document may annotate the document in Swedish. Annotation language 338 can be used to translate the annotation independent of the language of the original document. Thus, when a Scottish user in the UK opens the document, the Swedish language annotation can be translated into English and synchronized with the document opened by the Scottish user in the UK.

The annotation 312 and the annotation identifier 330 can be used to synchronize the annotation 312 to other documents that share the same document identifier in the annotation identifier.

Figure 4:
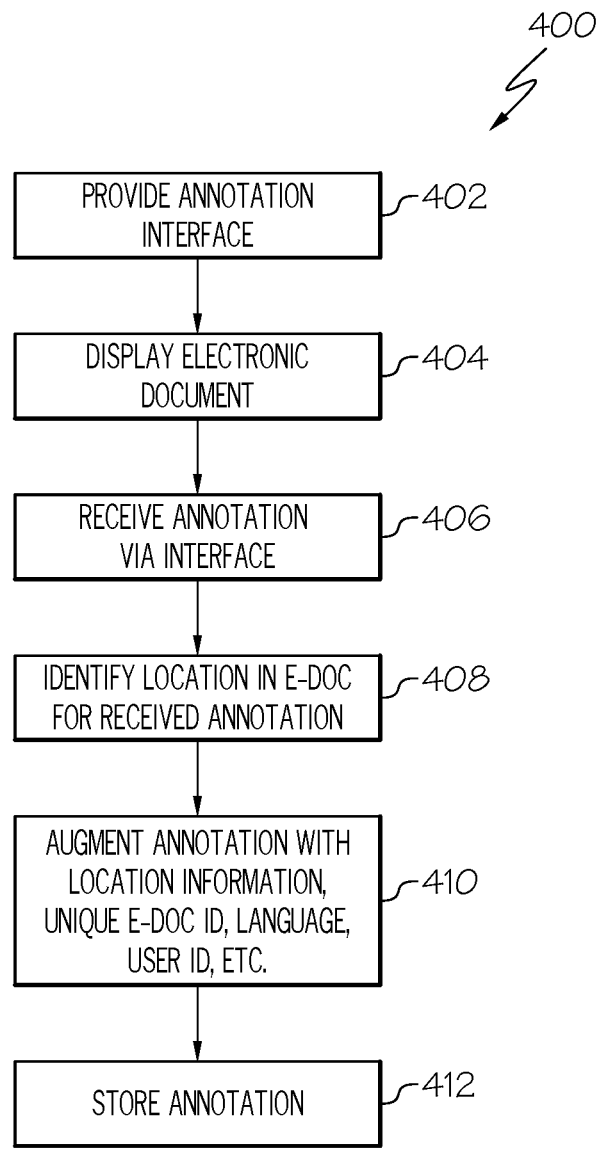
FIG. 4 is a process flow diagram for creating an annotation file in accordance with embodiments of the present disclosure.

FIG. 4 is a process flow diagram 400 for creating an annotation file in accordance with embodiments of the present disclosure. An annotation interface is provided to the user (402). The annotation interface can be a stand-alone program, a plug-in or overlay program, or other interface.

An electronic document can be displayed to the user 404. In some embodiments, the electronic document is displayed on the annotation interface, in a web browser, document editor, etc.

An annotation to the document can be received across the interface (406) by an annotation handling application. The location within the electronic document where the annotation was can be identified (408). For example, a page number, line number, chapter number, section number, etc. can be identified. The most precise location identifying where the annotation is located can be added to an annotation identifier, along with one or more of a document identifier, a language of the document, a user ID of the author of the annotation, and a language of the annotation (410).

The annotation can be stored as an annotation filed in an annotation library (412). The annotation library can be a local storage media, a portable storage medium, a cloud-based storage medium, a networked storage medium, etc.

Figure 5:
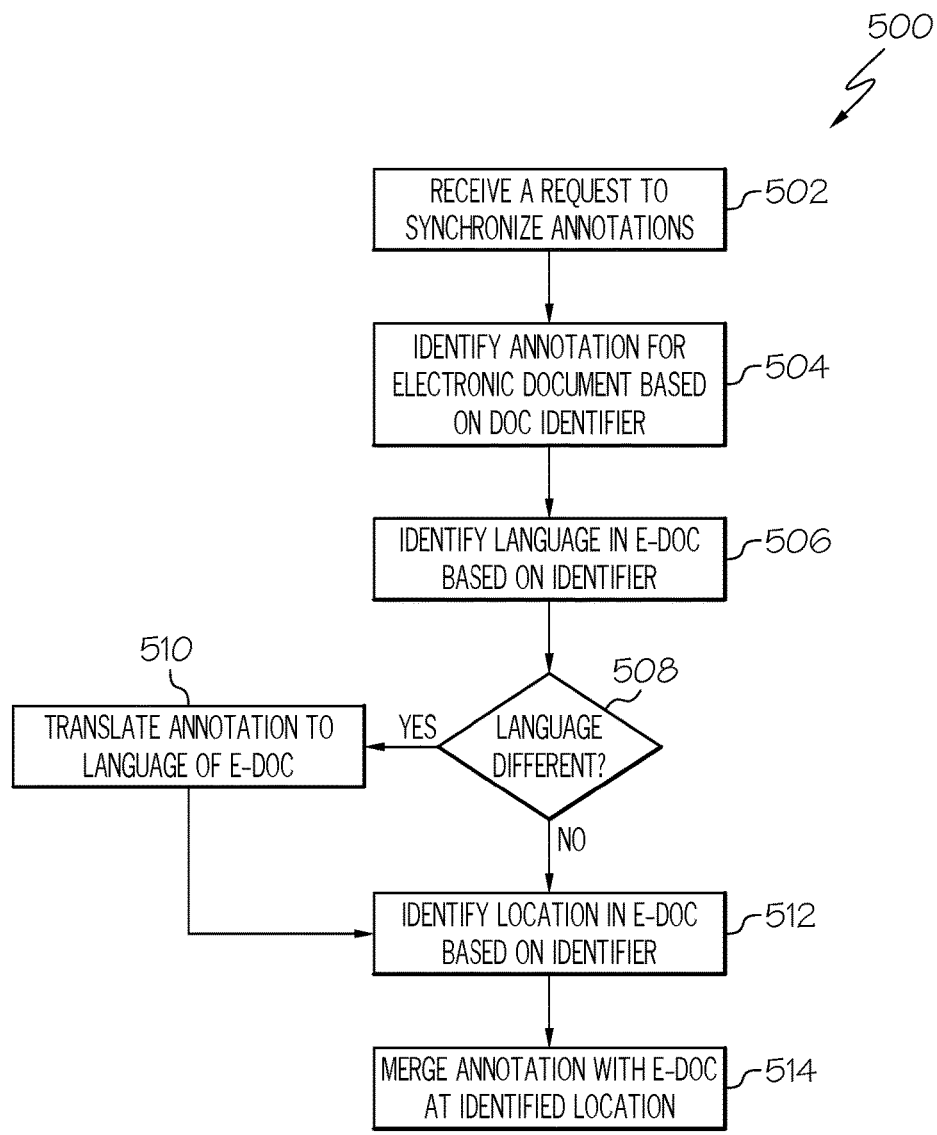
FIG. 5 is a process flow diagram for augmenting a document with an annotation in accordance with embodiments of the present disclosure.

The annotation file can be used to augment other documents with the annotation. FIG. 5 is a process flow diagram 500 for augmenting a document with an annotation in accordance with embodiments of the present disclosure. At the outset, an annotation handling application can receive a request to synchronize a document with a stored annotation (502). The annotation handling application can identify one or more annotations based on a document identifier from the document cross-referenced against a set of stored annotation identifiers (504).

A language of the annotation can be identified (506). For example, the language of the annotation can be extrapolated from a language identifier in the annotation identifier. The language identifier can indicate the language of the annotation or the language of the progenitor document (i.e., progenitor document meaning the document that was previously annotated).

A decision can be made whether the annotation needs to be translated into a different language (508). For annotations that are determined to be in a different language than the target document (i.e., the document to be augmented by the annotation file), a translation of the annotation is made (e.g., by a third party translation services or machine translation etc.).

The decision of whether to translate an annotation can be made automatically: for example, if the language identified by the annotation identifier is different from the language of the target document, then the annotation handling application can automatically have the annotation translated. A user can also be prompted for instructions about translating the language of the annotation: for example, if the language is determined to be different, then the application handling application can provide an identification of the language of the annotation to the user, and the user can decide whether to have the annotation translated.

After the annotation is translated (or if no translation is necessary), the application handling application can use the annotation identifier to identify a location within the target document to place the annotation (512). For a target document that is substantially similar to the progenitor document, the identification of the location for the annotation can be a matter of using the location information to directly place the annotation into the target document.

For target documents that may be different, e.g., different versions or languages, a closest location can be identified. For example, if a paragraph is deleted, then the annotation can be added to a page as close to that paragraph as possible.

The annotation can be merged with the target document at the identified location (514).

Figure 6:
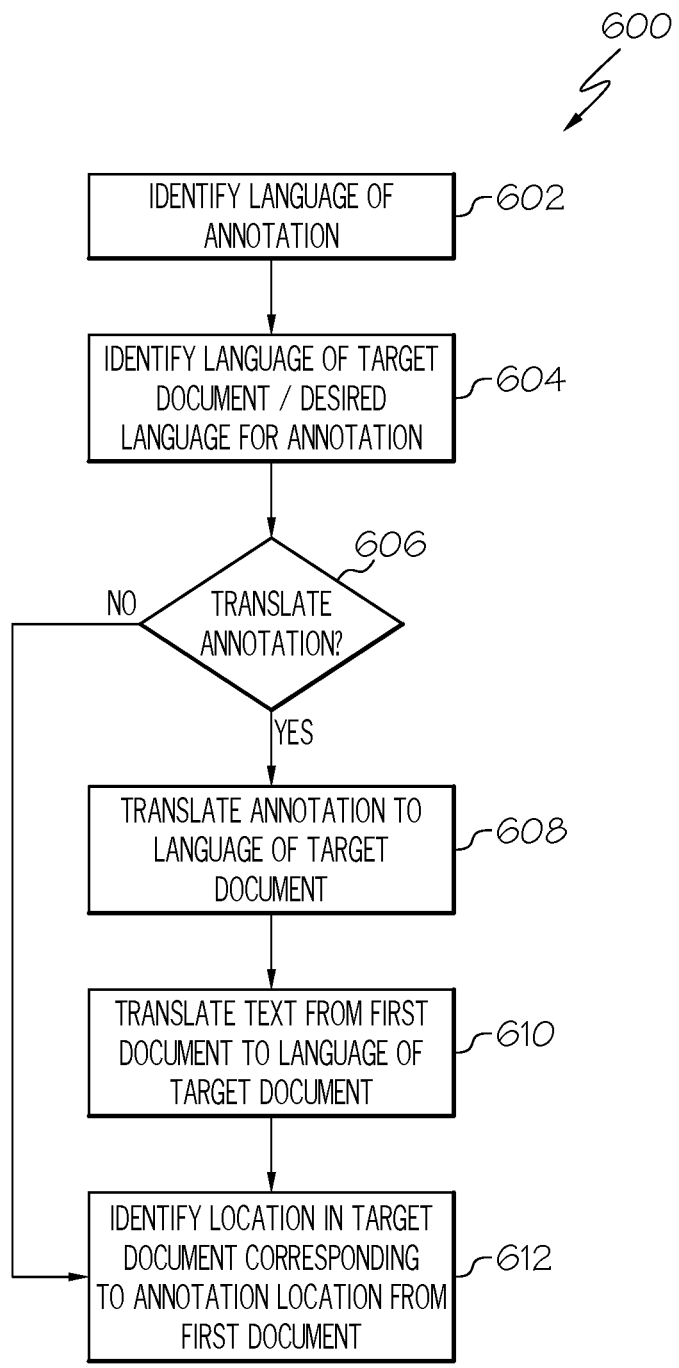
FIG. 6 is a process flow diagram for augmenting a document with a translated annotation in accordance with embodiments of the present disclosure.

FIG. 6 is a process flow diagram 600 for augmenting a document with a translated annotation in accordance with embodiments of the present disclosure. A language of an annotation can be identified (602). The language can be identified directly from the annotation identifier that reflects a language of the annotation. Or the language can be extrapolated from a document language identifier that reflects the language of a progenitor document. A language of the target document can be identified (604). The language of the target document can be identified using metadata about the target document. A determination can be made whether to translate the annotation (606). If the language of the annotation is different from the language of the target document, the language of the annotation can be automatically or can be translated upon request.

If the language of the annotation is to be translated, the annotation itself is translated into the target language (610). Translation can be done using a third party or by machine translation services.

In some embodiments, the language of the progenitor document at the location where the annotation is can also be translated to find a corresponding portion of text in the target document (610). This textual translation can be performed to identify a location in the target document that matches the annotated portion of the progenitor document (612).

Figure 7:
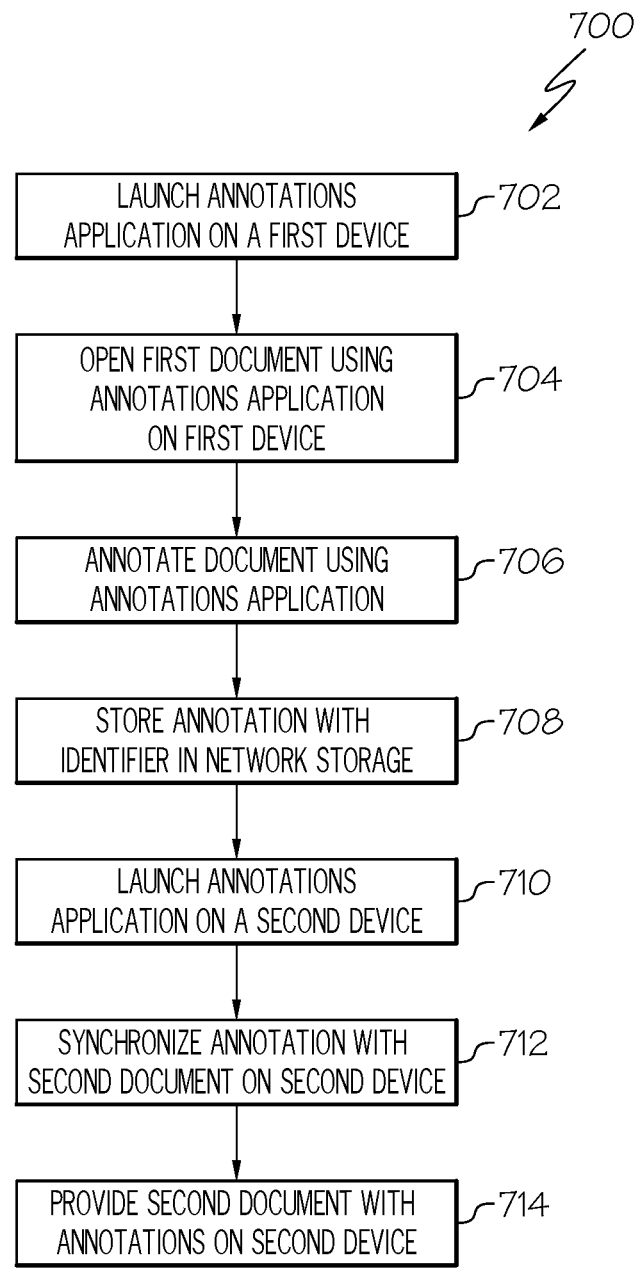
FIG. 7 is a process flow diagram for synchronizing an annotation across multiple devices.

FIG. 7 is a process flow diagram 700 for synchronizing an annotation across multiple devices. A user can launch an annotations handling application on a first device (702). The user can open a first (progenitor) document using an annotation handling application on the first device (704). The user can annotate the first document using the annotation handling application (706). The user can store the annotation in a network storage location along with an annotation identifier that includes one or more of document identifier, a language identifier, a version identifier, a language identifier, a user identifier, and a location identifier (708).

A second user (the same user or a different user) can launch an annotation handling application on a second device (710). The application handling application can synchronize a target document by augmenting the target document with the annotation. The synchronization can be triggered automatically when the second user launches the annotation handling application, or upon request. In some embodiments, synchronization is a push function that synchronizes all available target documents. Available target documents can be defined as documents available to the annotation handling application for synchronization (e.g., by subscription to a push service, assignment to a group, etc.).

The annotated target document can be provided to the user via the application handling application on the second device.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A computer implemented method comprising:
providing a graphical interface for annotating an electronic document;
receiving, from a first user, a first annotation to the electronic document via the interface;
associating the first annotation to the electronic document with a first cluster identifier, the first cluster identifier comprising a credential associated with the user, a unique identifier for the electronic document, and metadata associated with the electronic document, wherein the metadata comprises a first version number for the electronic document, the first cluster identifier further comprising a first language identifier indicating a first language of the electronic document; and
storing the annotation with the first cluster identifier;
the method further comprising:
receiving a second annotation associated with the electronic document, the second annotation comprising a second cluster identifier, the second cluster identifier comprising a second language identifier indicating a second language of the electronic document, and metadata indicating a second version number of the electronic document, the second version number greater than the first version number;
determining that the first annotation is applicable to the second version number of the electronic document; and
synchronizing electronic documents that are associated with the second version number with the first annotation;
the method further comprising:
determining, from the first cluster identifier, that the first annotation is in a first language based on the first language identifier;
determining from the second cluster identifier, that the second annotation is in a second language based on the second language identifier, the second language different from the first language;
determining, based on the second cluster identifier, a language of a version of the electronic document associated with the second version number of the electronic document; and
translating the first annotation into the language of the version of the electronic document associated with the second version number of the electronic document.

2. The method of claim 1, wherein the associating the electronic document with metadata associated with the electronic document comprises:
identifying a location in the electronic document associated with the annotation received from the user; and
wherein associating the annotation to the electronic document with metadata associated with the electronic document comprises associating the annotation with an identifier of the location of the electronic document associated with the annotation.

3. The method of claim 1, wherein the metadata associated with the electronic document comprises a version number, a page number of the electronic document, a section number of the electronic document, a chapter number of the electronic document, a paragraph number of the electronic document, a line number of the electronic document, a string of text from the electronic document, a figure number from the electronic document, or a table number from the electronic document,
wherein the cluster identifier comprises the metadata associated with the electronic document.

4. The method of claim 3, wherein the credentials associated with the user comprise one of a user login, a user e-mail address, a user account number, or unique identifier.

5. The method of claim 1, further comprising distributing the annotation with the cluster identifier to another user.

6. The method of claim 1, further comprising:
identifying a location in the first version of the electronic document for the annotation based, at least in part, on the metadata in the cluster identifier;
identifying a corresponding location in a local version of the electronic document; and
displaying the annotation in the corresponding location of the local version of the electronic document.

7. The method of claim 6, wherein the corresponding location of the local version of the electronic document is different than the location in the first version of the electronic document.

8. The method of claim 1, wherein a local version of the electronic document is in a different language from the first version of the electronic document.

9. The method of claim 8, further comprising:
identifying a location in the first version of the electronic document for the annotation based at least in part on organizational information in the metadata in the annotation identifier; and identifying a corresponding location in the local version of the electronic document based on the organizational information.

10. The method of claim 9, wherein the organizational information comprises a page number of the electronic document, a section number of the electronic document, a chapter number of the electronic document, a paragraph number of the electronic document, a line number of the electronic document, a string of text from the electronic document, a figure number from the electronic document, or a table number from the electronic document;
wherein the annotation identifier comprises the organizational information.

11. The method of claim 8, further comprising:
identifying the language of the first version of the electronic document based, at least in part, on a language identifier in the metadata in the annotation identifier;
identifying the language of the local version of the electronic document; and
translating the language of the first version to the language of the local version.

12. The method of claim 11, wherein translating the language of the first version to the language of the local version comprising requesting a translation from a network translation service.

13. The method of claim 1, further comprising:
storing the annotation of the first version of the electronic document based, at least in part, on the annotation identifier.

14. The method of claim 13, wherein storing the annotation of the first version of the electronic document comprises storing the annotation based on any one of the credentials associated with an author of the annotation, the unique identifier for the electronic document, or the metadata associated with the electronic document.

15. A non-transitory computer-readable medium having program instructions stored therein, wherein the program instructions are executable by a computer system to perform operations comprising:
providing a graphical interface for annotating an electronic document;
receiving, from a first user, a first annotation to the electronic document via the interface;
associating the first annotation to the electronic document with a first cluster identifier, the first cluster identifier comprising a credential associated with the user, a unique identifier for the electronic document, a first language identifier indicating a language of the electronic document, and metadata associated with the electronic document, wherein the metadata comprises a first version number for the electronic document; and
storing the annotation with the first cluster identifier;
the method further comprising:
receiving a second annotation associated with the electronic document, the second annotation comprising a second cluster identifier, the second cluster identifier comprising a second language identifier indicating a second language of the electronic document, and metadata indicating a second version number of the electronic document, the second version number greater than the first version number;
determining that the first annotation is applicable to the second version number of the electronic document; and
synchronizing electronic documents that are associated with the second version number with the first annotation;
the method further comprising:

determining, from the first cluster identifier, that the first annotation is in a first language based on the first language identifier;
determining from the second cluster identifier, that the second annotation is in a second language based on the second language identifier, the second language different from the first language;
determining, based on the second cluster identifier, a language of a version of the electronic document associated with the second version number of the electronic document; and
translating the first annotation into the language of the version of the electronic document associated with the second version number of the electronic document.

16. A system comprising:
a processor implemented at least in hardware;
a repository for storing annotation data; and
an annotation engine implemented at least in part in hardware to:
provide a graphical interface for annotating an electronic document;
receive, from a first user, a first annotation to the electronic document via the interface;
associate the first annotation to the electronic document with a first cluster identifier, the first cluster identifier comprising a credential associated with the user, a unique identifier for the electronic document, a first language identifier indicating a language of the electronic document, and metadata associated with the electronic document, wherein the metadata comprises a first version number for the electronic document; and
storing the annotation with the first cluster identifier;
the annotation further to:
receive a second annotation associated with the electronic document, the second annotation comprising a second cluster identifier, the second cluster identifier comprising a second language identifier indicating a second language of the electronic document, and metadata indicating a second version number of the electronic document, the second version number greater than the first version number;
determine that the first annotation is applicable to the second version number of the electronic document; and
synchronize electronic documents that are associated with the second version number with the first annotation;
the annotation engine further to:
determine, from the first cluster identifier, that the first annotation is in a first language based on the first language identifier;
determine from the second cluster identifier, that the second annotation is in a second language based on the second language identifier, the second language different from the first language;
determine, from the second cluster identifier, a language of a version of the electronic document associated with the second version number of the electronic document; and
translate the first annotation into the language of the version of the electronic document associated with the second version number of the electronic document.

17. The system of claim 16, wherein the system further comprises an annotation engine to store the annotation in a database in the repository and associate the annotation in the database with one of the annotation identifier, the credentials associated with an author of the annotation, the unique identifier for the electronic document, or the metadata associated with the electronic document.

18. The system of claim 17, wherein the system further comprises an annotation engine to:
- receive a search query for an annotation based on one of the annotation identifier, the credentials associated with an author of the annotation, the unique identifier for the electronic document, or the metadata associated with the electronic document;
- identifying the annotation based on the search query; and
- return the identified annotation.

19. The system of claim 17, wherein the system further comprises an annotation engine to:
- receive a request to sort annotations stored in the repository based on one of the annotation identifier, the credentials associated with an author of the annotation, the unique identifier for the electronic document, or the metadata associated with the electronic document;
- sorting annotations in the repository based on the request.

\* \* \* \* \*